US011747214B2

(12) United States Patent
Litteaur

(10) Patent No.: US 11,747,214 B2
(45) Date of Patent: Sep. 5, 2023

(54) TEMPERATURE SENSOR AND METHODS OF USE

(71) Applicant: Daily Thermetrics Corporation, Houston, TX (US)

(72) Inventor: Raymond B. Litteaur, Houston, TX (US)

(73) Assignee: Daily Thermetrics Corporation, Houston, TX (US)

( * ) Notice: Subject to any disclaimer, the term of this patent is extended or adjusted under 35 U.S.C. 154(b) by 0 days.

(21) Appl. No.: 17/855,210

(22) Filed: Jun. 30, 2022

(65) Prior Publication Data

US 2022/0334002 A1    Oct. 20, 2022

Related U.S. Application Data

(62) Division of application No. 16/429,899, filed on Jun. 3, 2019, now Pat. No. 11,408,779.

(51) Int. Cl.
*G01K 7/026* (2021.01)
*G01K 7/06* (2006.01)

(52) U.S. Cl.
CPC .............. *G01K 7/026* (2013.01); *G01K 7/06* (2013.01)

(58) Field of Classification Search
CPC .................................. G01K 7/026; G01K 7/06
See application file for complete search history.

(56) References Cited

U.S. PATENT DOCUMENTS

| 721,770 | A | 3/1903 | Zeleny |
| 1,224,385 | A | 5/1917 | Kennedy |
| 1,263,308 | A | 4/1918 | Bristol |
| 1,615,503 | A | 1/1927 | Brown |
| 1,969,141 | A | 8/1934 | McDonald |

(Continued)

FOREIGN PATENT DOCUMENTS

| DE | 102017110445 B4 * | 2/2020 | ........... G01K 15/007 |
| EP | 3719464 A1 * | 10/2020 | ................ B64F 5/60 |

(Continued)

OTHER PUBLICATIONS https://www.pyromation.com/products/Thermocouple/Thermocouple-Types.aspx.*

(Continued)

*Primary Examiner* — Mirellys Jagan
(74) *Attorney, Agent, or Firm* — Diana M. Sangalli; Duane Morris LLP

(57) ABSTRACT

A temperature sensing assembly includes a sheath defining an interior space, a first temperature sensor and a second temperature sensor. The first temperature sensor has first and second conductors extending within the interior space of the sheath and joined at a first junction point. The first conductor is constructed of a first material and the second conductor is constructed of a second material that is different than the second material. The second temperature sensor has third and fourth conductors extending within the interior space of the sheath and joined at a second junction point. The third conductor is constructed of a third material and the fourth conductor is constructed of a fourth material that is different than the fourth material. The first material is different than each of the third and fourth materials. The first junction point is adjacent to the second junction point.

12 Claims, 7 Drawing Sheets

(56) References Cited

U.S. PATENT DOCUMENTS

| | | |
|---|---|---|
| 2,694,930 A | 11/1954 | Lamb et al. |
| 2,839,594 A | 6/1958 | Schneidersmann |
| 3,015,954 A | 1/1962 | Daiglish |
| 3,232,794 A | 2/1966 | Korton |
| 3,416,972 A | 12/1968 | Haselton et al. |
| 3,468,723 A | 9/1969 | Lambert |
| 3,518,873 A | 6/1970 | Bonkowski et al. |
| 3,596,518 A | 8/1971 | Kirkpatrick |
| 3,653,262 A | 4/1972 | Ehrenfried et al. |
| 3,681,990 A | 8/1972 | Barrett et al. |
| 3,907,606 A | 9/1975 | Chang |
| 3,923,552 A | 12/1975 | Parris |
| 4,028,139 A | 6/1977 | Smith et al. |
| 4,075,036 A | 2/1978 | Lysikov et al. |
| 4,088,509 A | 5/1978 | Blaze, Jr. |
| 4,135,053 A | 1/1979 | Kastilahn et al. |
| 4,148,134 A | 4/1979 | Metz |
| 4,176,554 A | 12/1979 | Kazmierowicz |
| 4,183,243 A | 1/1980 | West |
| 4,313,792 A | 2/1982 | Smith |
| 4,376,227 A | 3/1983 | Hilbom |
| 4,385,197 A | 5/1983 | Schwagermart |
| 4,410,756 A | 10/1983 | Schwagerman |
| 4,412,090 A | 10/1983 | Kawate et al. |
| 4,440,509 A | 4/1984 | Agarwal |
| 4,445,788 A | 6/1984 | Twersky et al. |
| 4,499,330 A | 2/1985 | Pustell |
| 4,510,343 A | 4/1985 | Sivyer |
| 4,511,264 A | 4/1985 | Bucha et al. |
| 4,653,935 A | 3/1987 | Daily et al. |
| 4,725,399 A | 2/1988 | MoCulloch et al. |
| 4,848,927 A | 7/1989 | Daily |
| 4,971,452 A | 11/1990 | Finney |
| 5,064,506 A | 11/1991 | Sparenberg |
| 5,108,192 A | 4/1992 | Mailliet et al. |
| 5,158,366 A | 10/1992 | Nagai |
| 5,172,979 A | 12/1992 | Barkley |
| 5,192,132 A | 3/1993 | Pelensky |
| 5,228,114 A | 7/1993 | Suzuki |
| 5,232,517 A | 8/1993 | Hilborn et al. |
| 5,372,427 A | 12/1994 | Padovani |
| 5,454,641 A | 10/1995 | Parker |
| 5,707,151 A | 1/1998 | Parker |
| 5,772,329 A | 6/1998 | Bardon et al. |
| 5,775,807 A | 7/1998 | Dutcher |
| 5,812,588 A | 9/1998 | Deak et al. |
| 5,993,061 A | 11/1999 | Drouet |
| 6,158,886 A | 12/2000 | Dutcher |
| 6,334,707 B1 | 1/2002 | Ku |
| 6,431,750 B1 | 8/2002 | Haberbusch et al. |
| 6,536,950 B1 | 3/2003 | Green |
| 6,550,963 B2 | 4/2003 | Daily et al. |
| 6,599,011 B2 | 7/2003 | Daily et al. |
| 6,761,460 B2 | 7/2004 | Parnicza |
| 6,984,065 B2 | 1/2006 | Roepke |
| 7,789,555 B2 | 9/2010 | Harcourt |
| 8,870,455 B2 | 10/2014 | Daily et al. |
| 8,911,148 B2 | 12/2014 | Martensson |
| 9,557,225 B2 | 1/2017 | Daily et al. |
| 9,752,037 B2 | 9/2017 | Daily et al. |
| 10,175,117 B2 | 1/2019 | Branken et al. |
| 10,288,490 B2 | 5/2019 | Litteaur et al. |
| 10,295,491 B2 | 5/2019 | Daily et al. |
| 2002/0041621 A1 | 4/2002 | Faries, Jr. |
| 2002/0064206 A1 | 5/2002 | Gysling |
| 2002/0182119 A1 | 12/2002 | Daily |
| 2003/0016730 A1 | 1/2003 | Daily |
| 2004/0037350 A1 | 2/2004 | Parmicza |
| 2007/0127546 A1 | 6/2007 | Gul |
| 2007/0175266 A1 | 8/2007 | Harcourt |
| 2007/0258506 A1 | 11/2007 | Schwagerman et al. |
| 2011/0224907 A1 | 9/2011 | Chalifoux |
| 2011/0268154 A1 | 11/2011 | Hao |
| 2011/0299562 A1 | 12/2011 | Hashemian |
| 2012/0051389 A1 | 3/2012 | Schalles |
| 2013/0064268 A1* | 3/2013 | Foiret ............... G01K 15/00 374/E7.004 |
| 2013/0070808 A1 | 3/2013 | Daily et al. |
| 2013/0243035 A1 | 9/2013 | Walling |
| 2014/0376594 A1 | 12/2014 | Daily |
| 2016/0178448 A1 | 6/2016 | Malla |
| 2016/0252404 A1 | 9/2016 | Terada |
| 2017/0328781 A1 | 11/2017 | Litteaur |
| 2019/0032958 A1 | 1/2019 | Ohse |
| 2019/0107444 A1 | 4/2019 | Branken et al. |
| 2019/0226916 A1 | 7/2019 | Litteaur et al. |

FOREIGN PATENT DOCUMENTS

| | | |
|---|---|---|
| JP | H07286907 | 10/1995 |
| JP | 10-325759 | 12/1998 |
| WO | 9737391 | 10/1997 |
| WO | WO-9953280 A1 * | 10/1999 ............. G01K 7/026 |
| WO | 2010-100335 | 9/2010 |

OTHER PUBLICATIONS

Supplementary European Search Report, dated Feb. 18, 2015 Examination Search Report. Canadian Intellectual Property Office, dated Aug. 6, 2015.

PCT International Search Report, dated Feb. 26, 2013.

PCT International Preliminary Search Report co Patentability, dated Mar. 18, 2014.

International Search Report issued in connection with corresponding International patent application No. PCT/US2017/046492, dated Nov. 22, 2017, 3 pages.

Brochure, CERAMO(R) metal sheathed ceramic insulated thermocouple elements and CERAMOCOUPLES(R), Thermo-Electric Co., Inc., Saddle Brook, New Jersey, 16 pages, (1966).

Reed, R.P. "Branched thermocouple circuits in underground coal gasification experiments" ISA ASI 76244, pp. 295-306, 1976.

* cited by examiner

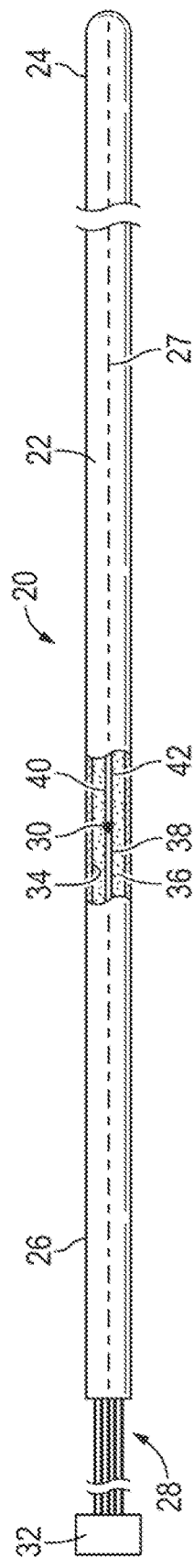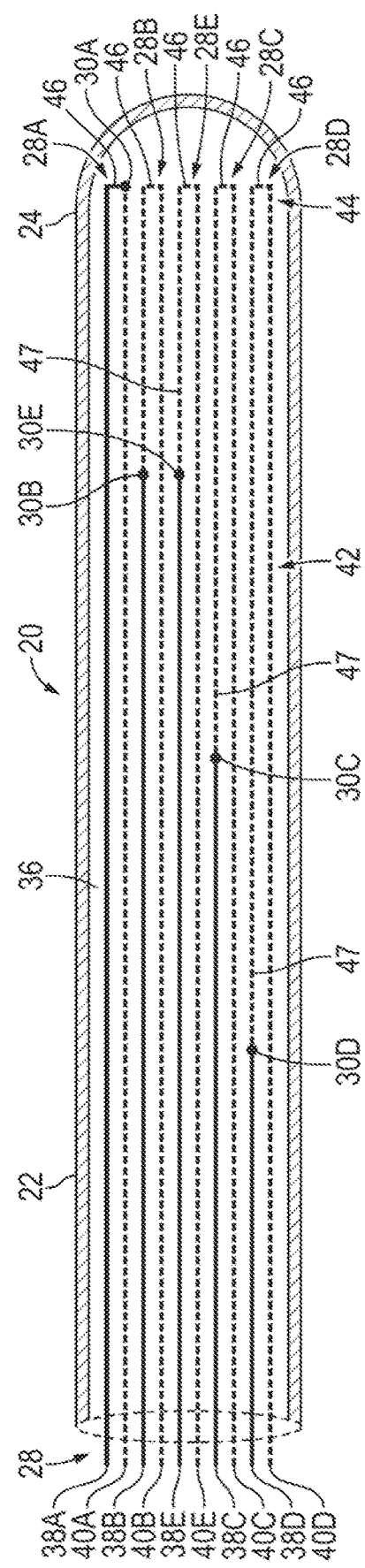
FIG. 1
FIG. 2A

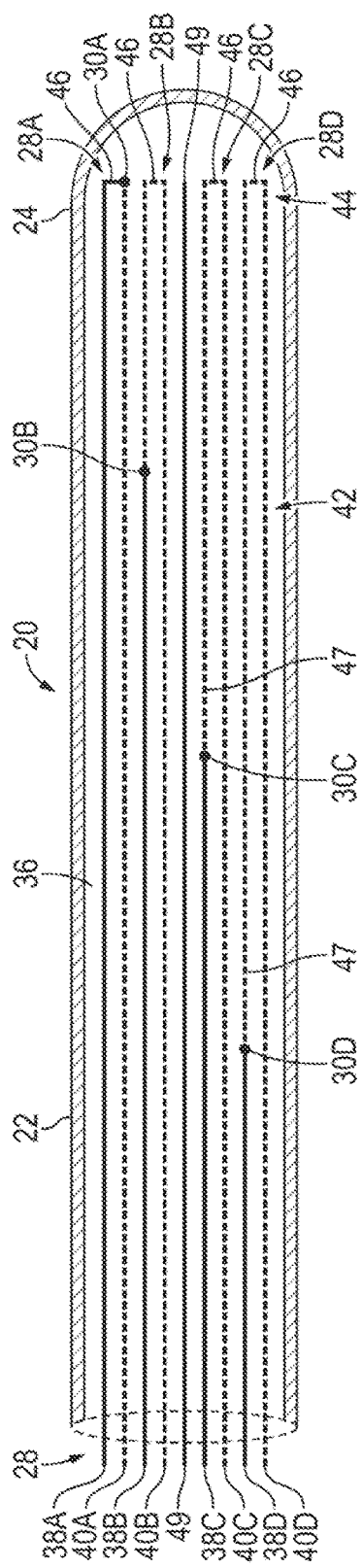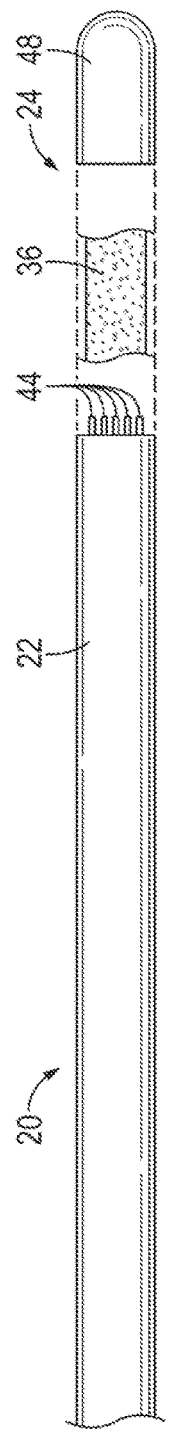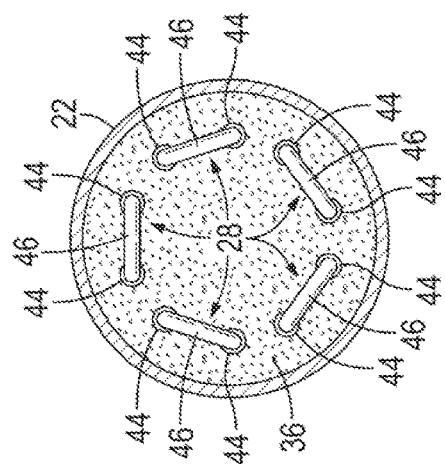

TEMPERATURE SENSOR AND METHODS OF USE

CROSS-REFERENCE TO RELATED APPLICATION

This application claims priority to U.S. patent application Ser. No. 16/429,899, filed on Jun. 3, 2019, the entirety of which is incorporated herein by reference.

FIELD

The present invention relates generally to sensing temperature, and particularly to thermocouples designed to sense temperature at multiple points.

BACKGROUND

Thermocouples are used in a variety of applications to sense temperature at a given location. A typical thermocouple comprises an external sheath and a pair of rod-shaped conductors disposed longitudinally within the sheath. Each conductor is of a dissimilar metallic material, and the two conductors are joined at a distal end within the sheath. An electrical insulation material also is packed about the rods within the sheath. The free ends of the conductors are connected to a detection instrument, such as a voltmeter, that measures the difference in potential created at the junction of the two metals. This difference in potential changes with temperature, thereby readily permitting the accurate detection of temperature at the junction point.

SUMMARY

In one aspect, a temperature sensing assembly includes a sheath defining an interior space, a first temperature sensor and a second temperature sensor. The first temperature sensor has a first conductor and a second conductor extending within the interior space of the sheath and joined at a first junction point to measure temperature. The first conductor is constructed of a first material and the second conductor is constructed of a second material. The first material is different than the second material. The second temperature sensor has a third conductor and a fourth conductor extending within the interior space of the sheath and joined at a second junction point to measure temperature. The third conductor is constructed of a third material and the fourth conductor is constructed of a fourth material. The third material is different than the fourth material. The first material is different than each of the third and fourth materials. The first junction point is adjacent to the second junction point such that a deviation of temperature measurements received from the first and second temperature sensors indicates that one of the first and second temperature sensors has corroded.

In another aspect, a temperature sensing assembly for monitoring temperature of a pressure vessel includes a sheath defining an interior space, a plurality of type K thermocouples, and at least one type N thermocouple. Each of the plurality of type K thermocouples has a junction point. The junction points of each of the plurality of type K thermocouples are spaced throughout the interior space of the sheath. The type N thermocouple has a junction point disposed within the interior space of the sheath.

In another aspect, a method of measuring temperature includes providing a temperature sensing assembly. The temperature sensing assembly includes a sheath defining an interior space, a first temperature sensor and a second temperature sensor. The first temperature sensor has a first conductor and a second conductor extending within the interior space of the sheath and joined at a first junction point to measure temperature. The first conductor is constructed of a first material and the second conductor is constructed of a second material. The first material is different than the second material. The second temperature sensor has a third conductor and a fourth conductor extending within the interior space of the sheath and joined at a second junction point to measure temperature. The third conductor is constructed of a third material and the fourth conductor is constructed of a fourth material. The third material is different than the fourth material. The first material is different than each of the third and fourth materials. The method further includes exposing the temperature sensing assembly to a process or a structure to monitor temperature. The method further includes receiving a first indication of temperature of the process or the structure from the first junction point at a first time. The method further includes receiving a second indication of temperature of the process or the structure from the second junction point at the first time. The method further includes comparing the first indication of temperature to the second indication of temperature.

In another aspect, a temperature sensing assembly includes a sheath defining an interior space, a plurality of temperature sensors, and a rod. Each of the plurality of temperature sensors has a first conductor and a second conductor extending within the interior space of the sheath and joined at a junction point to measure temperature. The first conductor of each of the plurality of temperature sensors is constructed of a first material and the second conductor of each of the plurality of temperature sensors is constructed of a second material. The first material is different than the second material. The rod extends within the interior space of the sheath and is constructed from a third material that is different than both the first and second materials. The third material has a lower electrode potential than both the first and second materials.

BRIEF DESCRIPTION OF THE DRAWINGS

The features of the embodiments described herein will be more fully disclosed in the following detailed description, which is to be considered together with the accompanying drawings wherein like numbers refer to like parts and further wherein:

FIG. 1 is a side view of temperature sensing assembly, according to one embodiment described herein.

FIG. 2A is a schematic, cross-sectional view of a temperature sensing assembly, according to one embodiment.

FIG. 2B is a schematic, cross-sectional view of a temperature sensing assembly, according to another embodiment.

FIG. 3 is a side view of the temperature sensing assembly of FIG. 1 with an end cap of the sheath separated from the remainder of the sheath.

FIG. 4 is an end view of the exposed conductor pair ends shown in FIG. 3.

DETAILED DESCRIPTION

Figure 5:
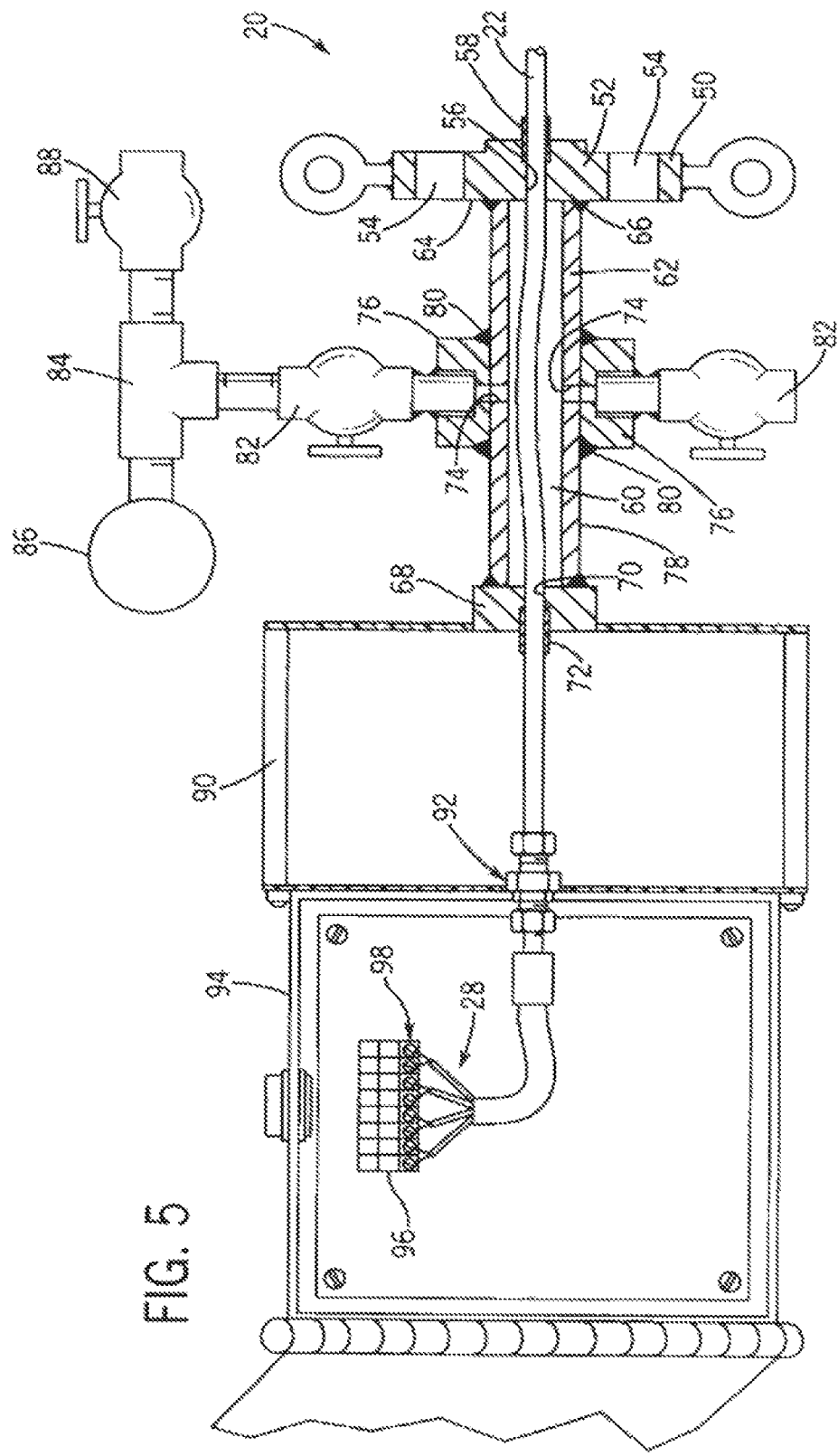
FIG. 5 illustrates an exemplary application of the thermocouple of FIG. 1.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring generally to FIG. 1, an exemplary temperature sensing assembly 20 is illustrated according to one embodiment. Temperature sensing assembly 20 includes a sheath 22 having an enclosed distal end 24 and an opposed end 26 from which a plurality of conductor pairs 28 extend. Each conductor pair comprises a pair of conductors of dissimilar materials, typically metals, that are joined at a junction point 30. For example, the dissimilar conductors may be welded together to form the junction. The free ends of the conductor pairs 28 are connected to instrumentation 32, e.g. a voltmeter, that measures the difference in potential created at the junction of the two metals. This difference in potential corresponds to a given temperature.

Sheath 22 typically comprises an open interior 34 into which conductor pairs 28 extend. Within interior 34, an insulation material 36, such as an electrical insulation material, is disposed about the individual conductors of conductor pairs 28. A variety of materials also may be used to form sheath 22. For example, stainless steel and Inconel™ are appropriate for use in a variety of applications. In the illustrated embodiment, insulation material 36 generally fills interior 34 about conductor pairs 28. Although various electrical insulation materials may be used, an exemplary material comprises magnesium oxide (MgO). In some embodiments, sheath 22 defines an axis 27 extending along its length, as shown in FIG. 1.

As illustrated best in FIGS. 2A and 2B, temperature may be determined at a plurality of locations along the length of sheath 22 by forming junction points at selected locations along the sheath. By way of example, the embodiment of FIG. 2A illustrates five conductor pairs 28A, 28B, 28C, 28D, and 28E each having its own unique junction point 30A, 30B, 30C, 30D, and 30E, respectively. The junction points 30A-30E are formed at unique longitudinal locations along sheath 22 to permit the sensing of temperature at those unique locations. It should be noted that five conductor pairs are illustrated for purposes of explanation and that various numbers of conductor pairs can be utilized. For example, two conductor pairs, three conductor pairs or even up to ten conductor pairs or more can be utilized within sheath 22 depending on space constraints and the desired application.

Each conductor pair comprises a first conductor 38 illustrated in solid line and a second conductor 40 illustrated in dashed line in FIG. 2A. The first conductor 38 and the second conductor 40 of each conductor pair 28 are made of dissimilar conductive materials. Typically, the thermocouple calibration or type is established by the National Bureau of Standards, e.g. J, K, T, E, R or S. The various types typically utilize pairs of dissimilar metallic materials. The following chart provides some examples.

| Thermocouple Calibration | B&S Wire Gauge | Recommended Temperature Limits F | Thermocouple Material | |
|---|---|---|---|---|
| | | | Positive | Negative |
| Type J | 8 ga. (.128") | 0 to 1400 | Iron | Constantan™ |
| | 14 ga. (.064") | 0 to 1100 | | |
| | 20 ga. (.032") | 0 to 900 | | |
| | 24 ga. (.020") | 0 to 700 | | |
| Type K | 8 ga. (.128") | 0 to 2300 | Chromel™ | Alumel™ |
| | 14 ga. (.064") | 0 to 2000 | | |
| | 20 ga. (.032") | 0 to 1800 | | |
| | 24 ga. (.020") | 0 to 1600 | | |
| Type T | 14 ga. (.064") | −300 to +700 | Copper | Constantan™ |
| | 20 ga. (.032") | −300 to +500 | | |
| | 24 ga. (.020") | −300 to +400 | | |

-continued

| Thermocouple Calibration | B&S Wire Gauge | Recommended Temperature Limits F | Thermocouple Material | |
|---|---|---|---|---|
| | | | Positive | Negative |
| Type E | 8 ga. (.128")<br>14 ga. (.064")<br>20 ga. (.032") | −300 to +1600<br>−300 to +1400<br>−300 to +1200 | Chromel ™ | Constantan ™ |
| Type R or<br>Type S | 24 ga. (.020") | to 2700 | Platinum 13 Rh<br>Platnum 10 Rh | Platinum<br>Platinum |

In various embodiments, various combinations of different conductor pair types can be utilized within a single sheath 22. For example, in one embodiment, as shown in FIG. 2A, temperature sensing assembly 20 includes at least one temperature sensor of a first type (e.g., conductor pairs 28A-28D), each extending within interior 34 of sheath 22. Each of the thermocouples of the first type include a first conductor (e.g., conductors 38A-38D) and a second conductor (e.g., conductors 40A-40D) joined at a junction point (e.g., junction points 30A-30D) to measure temperature. The first conductor is constructed of a first material and the second conductor is constructed of a second material that is different than the first material.

Temperature sensing assembly 20 may further include a temperature sensor of a second type (e.g., conductor pair 28E) having a third conductor (e.g., conductor 38E) and a fourth conductor (e.g., conductor 40E), each extending within interior 36 of sheath 22. The third conductor and fourth conductor are joined at a junction point (e.g., junction point 30E) to measure temperature. The third conductor is constructed of a third material and the fourth conductor is constructed of a fourth material that is different than the third material. In addition, the first material (i.e., the material of the first conductor of the temperature sensor of the first type) is different than each of the third and fourth materials. In some embodiments, the second material (i.e., the material of the second conductor of the temperature sensor of the first type) is also different than each of the third and fourth materials.

In various embodiments, one of the junction points of the first type of temperature sensor (e.g., junction point 30B) is adjacent to the junction point of the temperature sensor of the second type (e.g., junction point 30E). For example, in one embodiment, the first junction point (e.g., junction point 30B) is less than about 5 mm from the second junction point (e.g., junction point 30E) as measured along axis 27 of sheath 22. In another embodiment, the first junction point (e.g., junction point 30B) is less than about 10 mm from the second junction point (e.g., junction point 30E) as measured along axis 27. Because the junction points are adjacent, when installed in a process vessel, the junction points may be positioned within the same level of a process vessel such that the temperature measurements received from the first and second temperature sensors can be compared.

Because the first type of temperature sensor and the second type of temperature sensor have at least one conductor of dissimilar materials, they corrode at different rates. Hence, a deviation of the temperature measurements received from the first and second types of temperature sensors may indicate that at least one of the conductors of either first type of temperature sensor or the second type of temperature sensor has corroded. This may be an indication that corrective action should be taken, as described herein.

In one embodiment, the first type of temperature sensor is a type K thermocouple and the second type of temperature sensor is a type N thermocouple. In another embodiment, the first type of temperature sensor is a type J thermocouple and the second type of temperature sensor is a type E thermocouple.

While FIG. 2A illustrates only one thermocouple of the second type, any number of thermocouples of the second type may be included in temperature sensing assembly 100. For example, in some embodiments, there are an equal number of temperature sensors of the first type and of the second type. In other embodiments, a temperature sensor of the second type may be adjacent to every other temperature sensor of the first type.

Although a variety of techniques may be used to join the dissimilar conductors at desired junction points 30 within sheath 22, one technique is to provide conductor pairs 28 by forming a plurality of rods 42 that extend into sheath 22 to distal end 24, as further illustrated in FIGS. 3 and 4. For the first type of thermocouple (e.g., conductor pairs 28A-28D), the rods 42 are preformed of the first material, the second material, or a combination of the two. In FIG. 2A, for example, four rods are formed of the second material, one rod is formed of the first material and three rods are formed of a combination of the first material and the second material, with the materials joined at the desired junction point, e.g. 30B, 30C and 30D. When the rods are placed within sheath 22, the junction points 30A-30D are disposed at desired locations for sensing temperature.

For the second type of thermocouple, the rods 42 are preformed of the third material, the fourth material, or a combination of the two. In FIG. 2A, for example, one rod is formed of the fourth material and one rod is formed of a combination of the third and fourth materials, with the materials joined at the junction point, e.g., 30E.

Each of the rods 42 has a distal rod end 44, and the appropriate pairs of rod ends are joined together to form conductor pairs 28, as best illustrated in FIGS. 3 and 4. Although distal rod ends 44 may be joined in a variety of ways, the distal rod ends may be fused, e.g. welded, together at a fusion end 46. Alternatively, a cross piece or cross rod may be utilized. For example, a cross piece formed of the appropriate conductor material may be welded or otherwise joined to corresponding rod ends. When joined, at least some of the conductors comprise a return segment 47 (see FIG. 2A) that returns the conductor from the distal end to a junction point 30, e.g. 30B, 30C, 30D, 30E within sheath 22.

Although various processes may be used to form temperature sensing assembly 20, one exemplary methodology includes preparing those rods 42 with two dissimilar materials (e.g., the first material and second material or the third material and fourth material described above) by, for example, welding the dissimilar conducting materials together at predetermined points. The combination rods 42 along with the remaining rods 42 are then passed through insulation 36 within the open ended sheath 22 (see FIG. 3). Insulation 36 may initially be placed within sheath 22 in the form of beads. Sheath 22 is then swaged to compact the insulation 36 and sheath 22.

Following swaging, the insulation, e.g. MgO, is removed at distal end 24 and the appropriate rods are coupled to form conductor pairs 28, as best illustrated in FIG. 4. For example, cross pieces 46 may be welded across appropriate rod ends 44. An appropriate insulation material, such as magnesium oxide powder, is placed around the protruding rod ends and a sheath cap 48 is attached to the remainder of the sheath by, for example, welding.

In another embodiment, shown in FIG. 2B, temperature sensing assembly 20 includes a rod 49 extending within interior 34 of sheath 22. Rod 49 is constructed of a material that is different than the materials forming conductors 38, 40. Preferably, rod 49 is formed of a material that has a lower electrode potential than at least one material forming conductors 38, 40. In some embodiments, rod 49 has a lower electrode potential than each of the materials forming conductors 38, 40. Because rod 49 has a lower electrode potential than the material of conductors 38, 40, in use rod 49 acts as an anode and will corrode prior to corrosion of conductors 38, 40, as a result of galvanic (or bimetallic) corrosion. This may prevent, or delay, corrosion of conductors 38, 40 and, thereby, extend the useful life of temperature sensing assembly 20. In various embodiments, temperature sensing assembly includes a single rod 49. In other embodiments, temperature sensing assembly 20 includes more than one rod 49. For example, in at least one embodiment, temperature sensing assembly 20 includes one rod for each conductor pair 28. Rod 49 can have any appropriate geometry and size and can be rigid or flexible.

In some embodiments, rod 49 is constructed of pure titanium or a titanium alloy. The alloying material may be chosen based on the type of sensor used in temperature sensing assembly 20 (e.g., Type J, Type K). In embodiments in which thermocouples of multiple different types are used in temperature sensing assembly 20, multiple rods may be included and at least some of the rods may be constructed of different materials than the other rods. For example, one rod of pure titanium and one rod of titanium alloy may be included in temperature sensing assembly 20.

Temperature sensing assembly 20 is readily designed for a variety of applications. For example, one exemplary application utilizes temperature sensing assembly 20 for sensing temperature at a plurality of locations within an enclosed environment, such as a tank. Temperature sensing assembly 20 may further include a mounting system designed for attachment to a corresponding flange of a tank (described more fully below). Mounting system 50 comprises a plate 52 having a plurality of apertures 54 utilized in fastening plate 52 to the corresponding flange by, for example, threaded fasteners. Mounting system 50 further includes an opening or openings 56 through which sheath 22 passes into the container. Sheath 22 is sealed to plate 52 at its corresponding opening 56 by, for instance, a socket weld 58.

In the illustrated embodiment, a containment chamber 60 is formed by a containment wall 62 connected to a back surface 64 of plate 52. Containment wall 62 is connected to plate 52 by, for example, a weld 66. At an end opposite plate 52, containment chamber 60 is enclosed by a plate 68 having one or more plate openings 70 through which one or more sheaths 22 extend. Each sheath is sealed within its corresponding opening 70 by, for example, a socket weld 72.

Containment wall 62 also may include one or more openings 74 that provide selective access to the containment chamber. For example, in the illustrated embodiment, a pair of bosses 76 are attached to an exterior surface 78 of containment wall 62 proximate openings 74. The bosses 76 may be attached to containment wall 62 by appropriate welds 80.

Each boss 76 is designed to receive an appropriate instrument, e.g. a valve 82. In the illustrated embodiment, one of the valves 82 is coupled to a T-section 84 which, in turn, is coupled to a pressure gauge 86 and an additional valve 88. In this exemplary embodiment, the pressure gauge 86 is attached to determine whether any high pressure fluid leaks into containment chamber 60, as described in more detail below. Depending on the application, a variety of instruments may be coupled to containment chamber 60.

From containment chamber 60, sheath 22 extends through a support bracket 90 to which it is attached by appropriate fasteners 92, e.g. a bulk head connector. Subsequent to fastener 92, sheath 22 extends to a junction box 94 having a terminal block 96. The various conductor pairs 28 are coupled to appropriate terminals 98 of terminal block 96. The terminal block may be connected to appropriate instrumentation, such as instrumentation 32, to determine the various potential differences, and thereby the temperatures, at each of the junction points 30.

Figure 6:
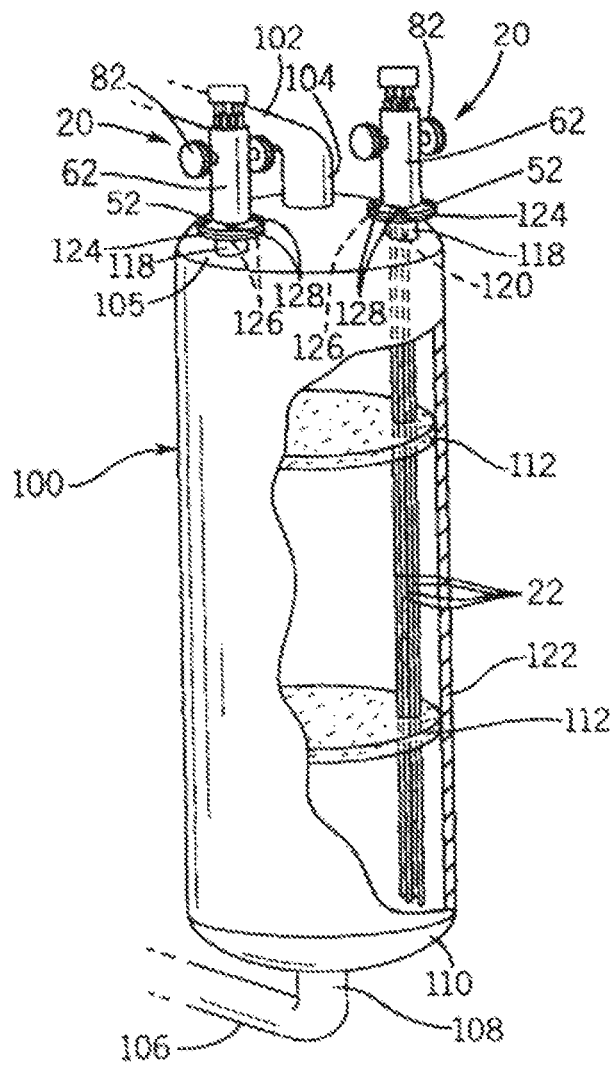
FIG. 6 illustrates a high pressure reaction vessel combined with a thermocouple, according to one embodiment described herein.
Figure 7:
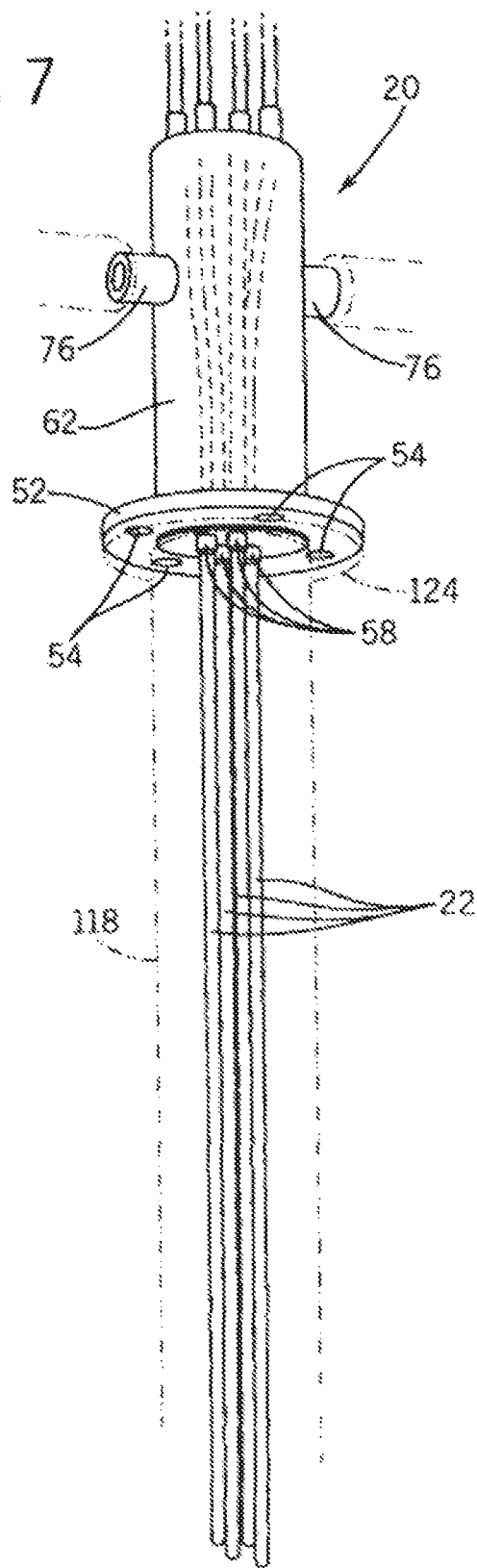
FIG. 7 illustrates an exemplary alternate embodiment of a temperature sensing assembly for use in a variety of applications.

Referring generally to FIGS. 6 and 7, a specific application of a temperature sensing assembly is illustrated. In this embodiment, a high pressure chemical reaction vessel 100 is designed for a desired chemical process. For example, high pressure vessel 100 may be utilized in the petroleum industry and may comprise a hydrocracker, a hydrotreater, a hydrogen reactor, a catalytic reactor, a catalytic cracker or an ethylene oxide reactor. Vessel 100 also may be utilized with weld pad or tube skin applications. In an exemplary application, one or more high pressure chemical reaction vessels 100 are coupled to a manifold pipe 102 by a connector pipe 104. Connector pipe 104 is disposed in fluid communication with the interior of vessel 100 generally at an upper portion 105 of vessel 100. Similarly, a second manifold pipe 106 is coupled to the one or more vessels 100 by an appropriate lower connector pipe 108. Lower connector pipe 108 generally is connected in fluid communication with vessel 100 at a lower or bottom portion 110. Manifold pipe 102 and second manifold pipe 106 can be used to provide ingress or egress of fluids moving to or from high pressure chemical reaction vessel or vessels 100.

In a petrochemical application, petrochemicals move into high pressure chemical reaction vessels 100 in either direction depending on the specific application. For example, flow can be from manifold pipe 102 downward through vessel 100 and out through second manifold pipe 106. Alternatively, the flow can be in the reverse direction moving from second manifold pipe 106 upwardly through vessels 100 to manifold pipe 102.

Typically, one or more beds 112 are deployed within high pressure chemical reaction vessel 100 at various levels. The number and type of beds vary according to the environment and the types of high pressure and high temperature reactions that take place within the reactor, e.g. high pressure chemical reaction vessel 100, for a given application. To sense the reaction temperature at different levels and to control the proper reaction rate, temperature is sensed at various selected levels within vessel 100. In some embodiments, two temperature sensors, each being a different type are deployed at a given level. For example, a type N and a type K thermocouple can be deployed at one or more levels within vessel 100. When both thermocouples are in good working condition, the absolute temperature measurement of the two thermocouples may be different, however, the temperature readings from the two thermocouples generally correlate with one another as the temperature within vessel 100 changes. However, as described herein, divergences in the temperature sensed by the different types of thermocouples within a given level may indicate that one of the conductors of one of the thermocouples has corroded. This may indicate that corrective action should be taken or that certain temperature measurements should be disregarded.

One or more temperature sensing assemblies 20 are deployed to extend downwardly into the interior of vessel 100 for sensing temperature at a plurality of longitudinal locations within the pressure vessel. It should be noted that one or more systems 20 also can be deployed from the side (e.g. horizontally) and/or from the bottom of vessel 100. As described above, sheath 22 may enclose a plurality of conductor pairs 28 designed to sense temperature at a plurality of unique, longitudinal positions along the sheath. However, additional sheaths can be designed to extend into pressure vessel 100 to provide an even greater number of sensing points for detecting temperature within vessel 100. For example, the embodiment illustrated best in FIG. 7 shows four sheaths extending downwardly from mounting plate 52. Each sheath 22 may enclose a plurality of conductor pairs 28, as described with reference to FIGS. 1-4. In embodiments in which more than one sheath is deployed, a first sheath may enclose thermocouples of a first type and a second sheath may enclose thermocouples of a second type. In such embodiments, divergence of the temperature measurements received from the thermocouples in the first sheath and the temperature measurements received from the thermocouples of the second sheath may indicate that the thermocouples in one of the sheaths has corroded.

The number of conductor pairs 28 within each sheath and the number of sheaths utilized can be adjusted according to application and design parameters. For example, a single sheath may be able to contain sufficient conductor pairs 28 to provide temperature sensing capability at all of the desired locations, or the temperature sensing junctions can be divided between additional sheaths. Also, the use of additional sheaths that each contain one or more conductor pairs 28 permits those sheaths to be bent, curled, arced or otherwise formed to sense temperatures at a variety of other locations within the vessel 100.

Figure 8:
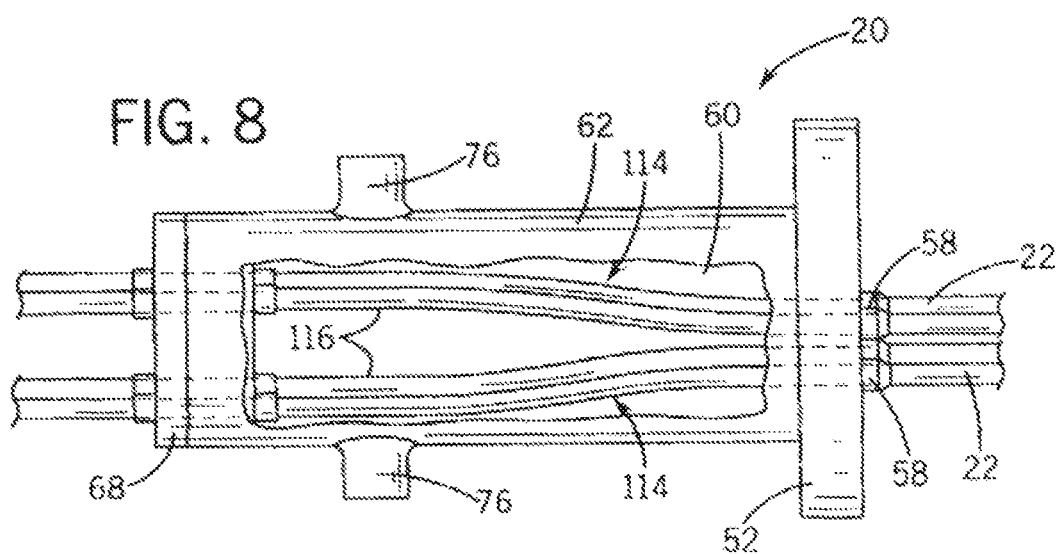
FIG. 8 is a partial cut-away view of a containment chamber utilized with the temperature sensing assembly of FIG. 7.

As illustrated best in FIG. 8, the one or more sheaths 22 preferably include a relief section 114 disposed within containment chamber 60 to facilitate flexing of the sheath due to, for example, thermal expansion. The relief section 114 of each sheath may comprise an arcuate section 116 that provides the sheath with sufficient flexibility.

Depending on the application and type of vessel 100 utilized in the application, the attachment of temperature sensing assembly 20 to pressure vessel 100 may vary. However, one exemplary embodiment utilizes a neck 118 fastened to vessel 100 by, for example, a weldment. Neck 118 is deployed around an opening 120 formed through the outer wall 122 of vessel 100. A flange 124 is connected to an upper end of neck 118 to facilitate mounting of temperature sensing assembly 20. Flange 124 typically is welded to neck 118. If additional temperature sensing assemblies 20 are utilized for a given application, a plurality of necks and flanges may be coupled to the pressure vessel as described.

Flange 124 may include a plurality of apertures 126 configured for alignment with apertures 54 of mounting plate 52. Appropriate fasteners 128, such as bolts, can be inserted through apertures 54 and 126 to secure each temperature sensing assembly 20 to the appropriate high pressure chemical reaction vessel 100. As illustrated, the sheath or sheaths 22 simply are inserted into the interior of vessel 100 via neck 118, and plate 52 is secured to flange 124. Additionally, appropriate seals can be utilized intermediate flange 124 and plate 52 to prevent escape of high pressure fluids, depending on a particular application, and as known to those of ordinary skill in the art. It should be noted that numerous types of flanges and other connectors can be utilized in coupling each temperature sensing assembly 20 to a given high pressure chemical reaction vessel. Additionally, or alternatively, temperature sensing assembly 20 may also be mounted to a vessel using any of the methods described in U.S. Pat. Nos. 8,870,455; 9,557,225; 9,752,937; and 10,175,117, which are each incorporated herein in their entireties by reference.

Figure 9:
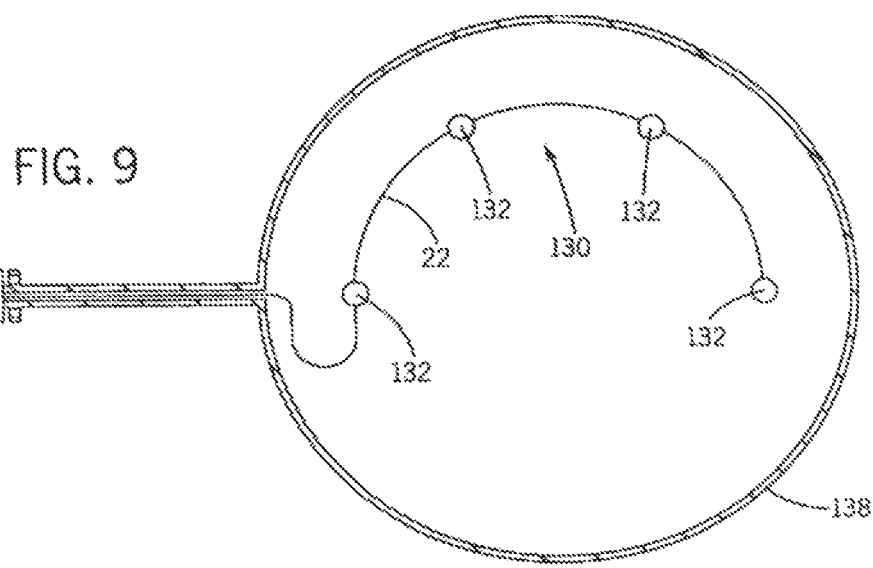
FIG. 9 is a top view of a schematic illustration of an application of a temperature sensing assembly to sense temperature at a variety of locations or points within a chamber.

The use of multiple conductor pairs able to sense temperature at a plurality of unique locations within a single sheath permits great flexibility in the design of the thermocouple. For example, the sheath may be formed along a contour 130, as illustrated in FIG. 9. The multiple conductor pairs 28 having junction points 30 separated longitudinally along the sheath 22 permits detection of temperature at a plurality of unique locations 132 along contour 130. Thus, the temperature detection points are not necessarily disposed linearly along a relatively straight sheath. As described above, a thermocouple of a different type (i.e., comprised of conductors of different material than the other thermocouples) may be provided at, or adjacent to, one or more of unique locations 132.

Figure 10:
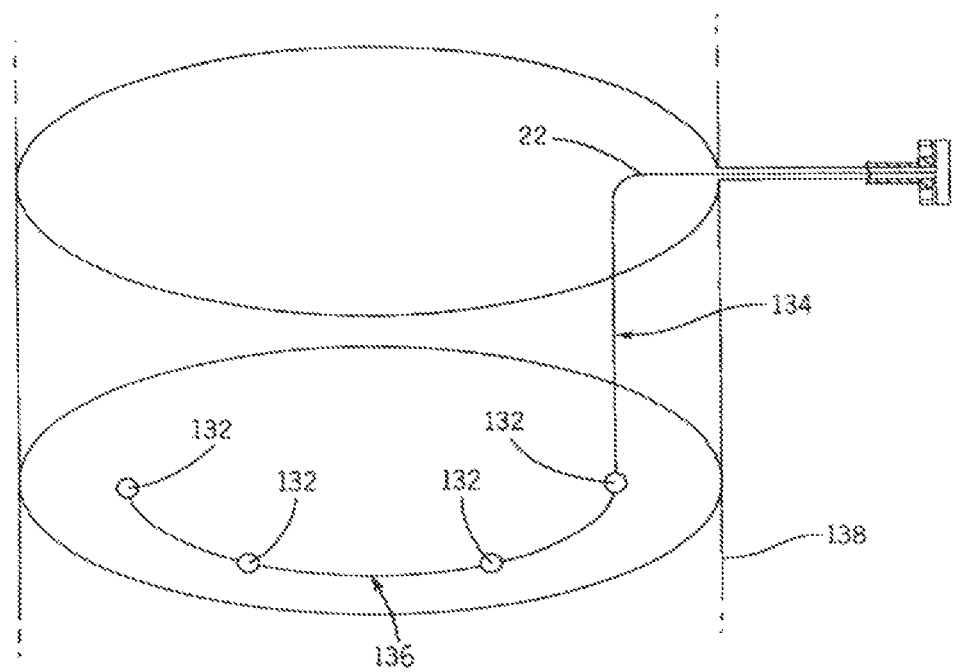
FIG. 10 is a perspective view of a schematic illustration of another application of a temperature sensing assembly to sense temperature at a variety of locations or points within a chamber.

The contour 130 illustrated in FIG. 9 is formed as an arc, however, contour 130 may comprise a variety of other shapes and arrangements. For example, the embodiment of FIG. 10 utilizes a sheath that is bent downwardly along a relatively straight contour 134 before transitioning into an arced contour 136. Contour 136 is deployed generally along the arcuate outer wall of a vessel 138, as illustrated in both FIGS. 9 and 10.

Figure 11:
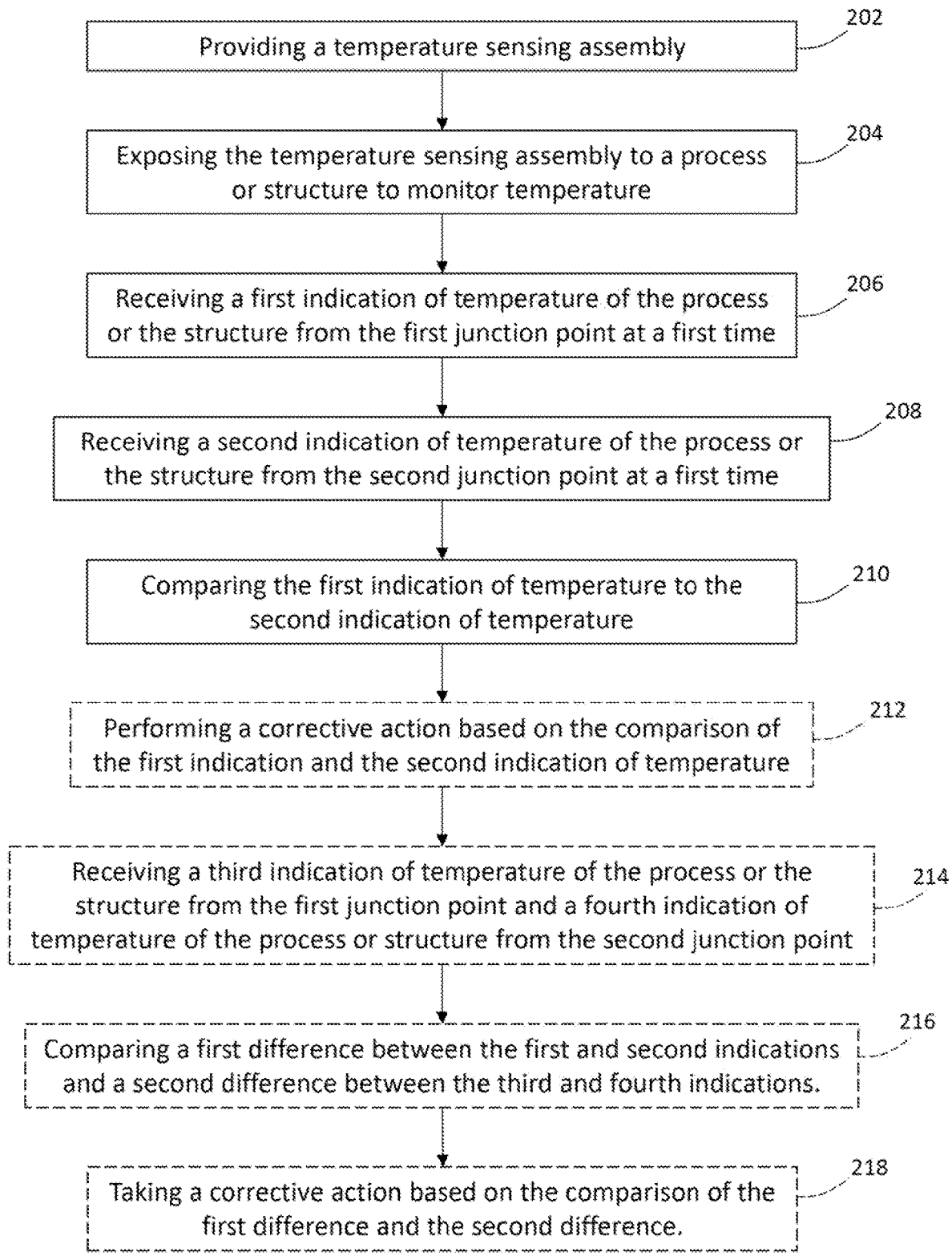
FIG. 11 illustrates a method of measuring the temperature of a process or vessel.

A method of measuring temperature is illustrated in FIG. 11. The method includes, at block 202, providing a temperature sensing assembly. For example, the temperature sensing assembly may be temperature sensing assembly 20 described above. The temperature sensing assembly may include a sheath defining an interior space. The temperature sensing assembly may further include a first temperature sensor having a first conductor and a second conductor extending within the interior space of the sheath and joined at a first junction point to measure temperature. The first conductor is constructed of a first material and the second conductor is constructed of a second material that is different than the first material. The temperature sensing assembly also includes a second temperature sensor having a third conductor and a fourth conductor extending within the interior space of the sheath and joined at a second junction point to measure temperature. The third conductor is constructed of a third material and the fourth conductor is constructed of a fourth material that is different than the third material. Further, the first material is different than each of the third and fourth materials.

The method further includes, at block 204, exposing the temperature sensing assembly to a process or structure to monitor temperature. For example, the temperature sensing assembly may be deployed in an enclosed environment, such as a tank, as described above. The method further includes, at block 206, receiving a first indication of temperature of the process or the structure from the first junction point at a first time. The method further includes, at block 208, receiving a second indication of temperature of the process or the structure from the second junction point at the first time. The method further includes, at block 210, comparing the first indication of temperature to the second indication of temperature.

The method may further include, at block 212, performing a corrective action based on the comparison of the first indication of temperature and the second indication of temperature. The corrective action may include, for example, applying a correction factor to the temperature measurement received from the first or second temperature sensor. Alternatively, or additionally, the corrective action may include disregarding subsequent temperature measurements received from the first or second temperature sensor. The corrective action may also include repairing or replacing one or both of the first or second temperature sensors.

In some embodiments, the method further includes, at block 214, receiving a third indication of temperature of the process or the structure from the first junction point and a fourth indication of temperature of the process or the structure from the second junction point, where the third and fourth indications are taken subsequently to the first and second indications. In such embodiments, at block 216, the method may further include comparing a first difference between the first and second indications and a second difference between the third and fourth indications. The method may further include, at block 218, taking a corrective action based on the comparison of the first difference and the second difference. The corrective action may include, for example, those described above.

It will be understood that the foregoing description is of exemplary embodiments of this invention, and that the invention is not limited to the specific forms shown. For example, the materials utilized in forming the thermocouples may be adjusted according to changes in thermocouple design, advancement of material science, the environment of use, etc. Additionally, the multipoint thermocouples described can be utilized in a variety of applications that may require various mounting structures, support structures and instrumentation. Various applications may or may not require containment chambers, and a variety of vessels ranging from low pressure vessels to high pressure vessels may be utilized for the reaction and/or flow of a variety of substances. These and other modifications may be made in the design and arrangement of the elements without departing from the scope of the invention as expressed in the appended claims.

What is claimed is:

1. A temperature sensing assembly, comprising:
   a sheath defining an interior space;
   a first temperature sensor having a first conductor and a second conductor extending within the interior space of the sheath and joined at a first junction point to measure a temperature, wherein the first conductor is constructed of a first material and the second conductor is constructed of a second material, and wherein the first material is different than the second material; and
   a second temperature sensor having a third conductor and a fourth conductor extending within the interior space of the sheath and joined at a second junction point to measure a temperature, wherein the third conductor is constructed of a third material and the fourth conductor is constructed of a fourth material, and wherein the third material is different than the fourth material;
   wherein the first material is different than each of the third and fourth materials, and wherein the first junction point is adjacent to the second junction point relative to a longitudinal axis of the sheath such that a deviation of temperature measurements received from the first and second temperature sensors indicates that one of the first and second temperature sensors has corroded.

2. The assembly of claim 1, wherein the second material is different than each of the third and fourth materials.

3. The assembly of claim 1, wherein the first temperature sensor is a type K thermocouple and the second temperature sensor is a type N thermocouple.

4. The assembly of claim 1, wherein the first temperature sensor is a type J thermocouple and the second temperature sensor is a type E thermocouple.

5. The assembly of claim 1, further comprising an electrical insulation material disposed within the sheath about the first, second, third, and fourth conductors.

6. The assembly of claim 1, further comprising a containment housing having a containment chamber therein, wherein the sheath is disposed through the containment chamber such that the portion of the sheath in which the first junction point and the second junction point are disposed extends from the containment housing.

7. The assembly of claim 1, wherein the first junction point is adjacent the second junction point within a distance of about 10 mm or less relative to the longitudinal axis of the sheath.

8. The assembly of claim 1, wherein the first junction point is adjacent the second junction point within a distance of about 5 mm or less relative to the longitudinal axis of the sheath.

9. The assembly of claim 1, further comprising a third temperature sensor having a fifth conductor and a sixth conductor extending within the interior space of the sheath and joined at a third junction point to measure temperature, wherein the fifth conductor is constructed of the first material and the sixth conductor is constructed of the second material.

10. The assembly of claim 9, wherein the third junction point is spaced apart from the first and second junction points relative to the longitudinal axis of the sheath.

11. A temperature sensing assembly for monitoring a temperature of a pressure vessel in which a process is carried out, comprising:
    a sheath defining an interior space;
    a plurality of type K thermocouples, each of the plurality of type K thermocouples having a junction point, the junction points of each of the plurality of type K thermocouples spaced throughout the interior space of the sheath to monitor a temperature of a structure of or a process carried out in a pressure vessel; and
    at least one type N thermocouple, a junction point of the at least one type N thermocouple disposed within the interior space of the sheath to monitor a temperature of the structure of or the process carried out in the pressure vessel,
    wherein the junction point of the at least one type N thermocouple is adjacent to the junction point of one of the plurality of type K thermocouples within a distance of about 10 mm or less relative to a longitudinal axis of the sheath, such that a deviation of temperature measurements received from the junction point of the at least one type N thermocouple and the adjacent junction point of the one of the plurality of type K thermocouple indicates that one of the at least one type N thermocouple and the one of the plurality of type K thermocouples has corroded.

12. The assembly of claim 11, further comprising a containment housing having a containment chamber therein, wherein the sheath is disposed through the containment chamber such that the portion of the sheath in which the junction points of each of the plurality of type K thermocouples and the junction point of the at least one type N thermocouple are disposed extends from the containment housing.

\* \* \* \* \*